United States Patent [19]

Prosise

[11] Patent Number: 4,917,909

[45] Date of Patent: * Apr. 17, 1990

[54] LOW OIL POTATO CHIPS AND PROCESS FOR PREPARING

[75] Inventor: William E. Prosise, Ramsey, N.J.

[73] Assignee: GAF Chemicals Corporation, Wayne, N.J.

[*] Notice: The portion of the term of this patent subsequent to Apr. 17, 2007 has been disclaimed.

[21] Appl. No.: 370,479

[22] Filed: Jun. 23, 1989

[51] Int. Cl.$^4$ ............................................. A23L 1/217
[52] U.S. Cl. ..................................... 426/102; 426/302; 426/438; 426/637; 426/808
[58] Field of Search ............... 426/102, 302, 637, 438, 426/808, 441

[56] References Cited

U.S. PATENT DOCUMENTS

| | | |
|---|---|---|
| 3,424,591 | 1/1969 | Gold . |
| 3,846,572 | 11/1974 | Nonaka et al. ...................... 426/429 |
| 4,511,583 | 4/1985 | Olson et al. ........................... 426/89 |
| 4,565,702 | 1/1986 | Morley et al. ........................ 426/93 |
| 4,721,625 | 1/1988 | Lee et al. ............................. 426/438 |

Primary Examiner—Arthur L. Corbin
Attorney, Agent, or Firm—Walter Katz; Marilyn J. Maue; Joshua J. Ward

[57] ABSTRACT

Low oil potato chips which are crisp and flavorful are provided herein. The potato chips of the invention are made by coating suitable potato slices with polyvinylpyrrolidone to provide the potato slices with increased resistance to oil absorption during frying.

16 Claims, No Drawings

LOW OIL POTATO CHIPS AND PROCESS FOR PREPARING

BACKGROUND OF THE INVENTION

1. Field of the Invention

This invention relates to low oil potato chips which are crisp and flavorful.

2. Description of the Prior Art

Conventional potato chip products are prepared by the basic steps of slicing peeled raw potatoes and frying them in oil at 350° F. for 2 to 4 minutes, or until a moisture content of approximately 1%-2% by weight is achieved, for example, by frying for 3 minutes at 350° F. The fried chips are then salted and packaged.

The moisture content of raw potato slices normally is from 75% to 85%, depending on environmental growing conditions and varieties. When potato slices are fried in oil at high temperature, this substantial amount of moisture present boils explosively. This results in burst cell walls, and consequently, the formation of capillary holes and voids. Oil adheres to the surfaces of the chips and is also absorbed into the holes and voids in the slices, particularly if the chips leave the drying oil, are exposed to the atmosphere, and cool, creating a vacuum effect. For these reasons, regular potato chips have high oil contents, ranging from 35% to 39%, and even as high as 42%.

The oil content of potato chips is important for many reasons. Oil is a costly raw material and is an important determinant of chip cost. From the standpoint of good nutrition, it is desirable to maintain a low level of oil in chips. A high oil content not only is costly to the processor but often renders the chips greasy or oily and hence, less desirable to consumers. On the other hand, it is possible to make chips so low in oil that they lack flavor and seem harsh in texture.

Chip producers generally are interested in making acceptable chips of lower oil contents than the 35%-39% norm. A large segment of the population, particularly those of middle age and older, is generally interested in reducing its intake of both fats and calories. Moreover, the relative and absolute size of this segment of the population is increasing.

Accordingly, in recent years the art has begun to recognize the desirability of reducing the oil content of potato chip products from both nutritional and cost standpoints. However, past attempts at producing low oil content chips have not been commercially successful, since any significant reduction in oil content has come at the expense of the desired organoleptic properties, particularly as to taste and texture.

The state of the art in this field may be ascertained by consideration of the following references.

Lee et al., in U.S. Pat. No. 4,721,625, for example, provides a process of preparing low oil potato chips by partially frying chip slices in hot oil, transferring the partially fried chip slices to an oxygen-free atmosphere, removing substantially all of the residual oil on the slices by blasting with saturated steam, and drying in an atmosphere of superheated steam. However, a substantial investment in capital plant and equipment is required to convert a conventional potato chip manufacturing facility to the Lee process.

Nonaka et al., in U.S. Pat. No. 3,846,572, discloses a process for preparing fried potato products of decreased oil content by freezing the raw potato strips in dichlorodifluoromethane, leaching in water, frying in oil, and thereafter removing excess oil on the surface of the strips by immersing in oil-free dichlorodifluoromethane. However, dichlorodifluoromethane is considered harmful to the ozone layer and, for this reason, is not a readily available chemical product.

Gold, in U.S. Pat. No. 3,424,591, describes a process for preparing French fried potato products having a reduced oil content by treating the potato pieces prior to frying with an aqueous solution of a methyl cellulose. In the Gold process, a thin coating of a thermal gel of methylcellulose and bound water is formed on the potato pieces. It has been determined, however, that thermal gel-coated potato chips contain over 10% by weight water compared to only 4% or less in uncoated potato chips. This high water content causes thermal gel-coated chips to exhibit a soggy texture which is unacceptable to the consumer. Furthermore, thermal gel potato chips achieve an oil reduction of only 4%, which is marginal at best.

Olson et al., in U.S. Pat. No. 4,511,583, describes a process for preparing a battered and breaded food item with reduced oil absorption. The process comprises applying a starch or gelatin film to the batter to prevent oil absorption by the finished breading product upon frying. However, no mention is made of potato chip products containing starch or gelatin films.

Morley, in U.S. Pat. No. 4,565,702, describes coating of insoluble dietary fibers derived from cereal bran with soluble dietary fibers of alignates, gums, pectin, mucillages and plant exudates to mask the taste and texture of the cereal bran. Other soluble dietary fibers are disclosed as useful, including biosynthetic or fermentation products such as dextran, xanthan and curdan; and chemically modified cellulose, pectin and alignate materials. Synthetic products including polyvinylpyrrolidone, carboxyvinyl polymers and polyethylene oxide polymers were mentioned as suitable soluble fibers for the purpose intended. However, there was no suggestion that any soluble dietary fiber could be used for making deep fried potato products, or particularly, for reducing oil absorption into potato chip products.

Accordingly, it is an object of this invention is to provide a low oil potato chip product which is crisp and flavorful.

Another object of the invention is to provide an economical process for making such low oil potato chips.

These and other objects and features of the invention will be made apparent from the following description of the invention.

SUMMARY OF THE INVENTION

In accordance with the invention, low oil potato chips which are crisp and flavorful are provided herein.

The potato chips of the invention are made by coating suitable potato slices with polyvinylpyrrolidone to provide the potato slices with increased resistance to oil absorption during frying. The finished potato chip herein displays the desirable organoleptic properties of crispness and flavor.

Oil reductions of 30% or more are achieved using polyvinylpyrrolidone coatings in the range of about 0.2-10% by weight, preferably about 0.5-5%, of the finished potato chip.

DETAILED DESCRIPTION OF THE INVENTION

In accordance with the invention, peeled raw potatoes are cut into potato slices having a thickness of about 0.03 to 0.10 inches, and, preferably, 0.050 to 0.075 inches, which is suitable for making potato chips. The potato slices then are provided with a coating of polyvinylpyrrolidone. Suitably, this coating may be provided by dipping the slices into an aqueous polyvinylpyrrolidone solution, or by spraying the solution onto the slices. The applied coating is then dried, e.g. in air, to form a substantially continuous, dry coating of uniform consistency. Generally, an aqueous polyvinylpyrrolidone solution having a concentration of 1–50% by weight polyvinylpyrrolidone is used. High solution concentrations are preferred because thicker coatings can be formed more rapidly. The polyvinylpyrrolidone coatings usually comprise about 0.1–6% by weight, preferably 0.4–3%, of the dry, coated slices.

Suitable PVP polymers utilizable herein are those having a purity sufficient for use as a food additive. The molecular weight of the PVP used is generally in the range of about $M_w = 1 \times 10^3$ to $2 \times 10^6$ (K-12 to K-120), and preferably from 2,000 to 70,000.

While raw potato slices are preferred for application of the PVP coating, precooked, reformed or partially fried potato slices also may be used.

The PVP-coated potato slices then are deep fried in oil in the usual manner to form the finished potato chip food product. The frying step reduces the moisture content of the potato to about 4% by wt. or less. At the same time, oil is introduced. Therefore, the PVP content in the finished potato chip is about 0.2–10% by weight, preferably 0.5–5%.

The PVP-coated potato chips of the invention show an oil reduction of 20% or more, and about the same moisture content, when compared to potato chips made without PVP. Generally the total oil content of PVP-coated potato chips is about 23% by weight of the chip, compared to 33 or more in uncoated potato chips.

The PVP-coated potato chips of the invention also have excellent organoleptic properties. Specifically, the chips herein have a very crisp texture, which is not oily, are golden brown in color, and display a flavor which is potato-like, hearty and earthy. In blind testings, the potato chips of the invention are preferred over uncoated potato chips.

The invention will now be illustrated by the following working examples.

EXAMPLE 1

Idaho fancy grade potatoes were peeled, cut into slices of 2 mm. thickness, washed with water, and divided into two 200 g. batches. One batch was dipped into a 20% w/w solution of PVP (K-15) (GAF Corp.) for ten minutes. The other batch was immersed in water. The treated potato slices in both batches then were air dried, and separately deep fried in 1500 g. of edible frying oil at 375° F. for 4.5 minutes. The fried slices then were lifted out of frying oil and drained of non-absorbed surface oil for 1 minute over the fryer. After cooling, the potato chip products were analyzed and evaluated. The results are shown below.

TABLE 1

| | Chemical Analysis | | | |
|---|---|---|---|---|
| | % by wt. PVP | % by wt. H₂O | % by wt. Oil | % Oil Reduction |
| PVP-Coated Potato Chips | 1.2 | 4.5 | 22.8 | 31 |
| Uncoated Potato Chips | — | 4.7 | 32.6 | |

TABLE 2

| | Organoleptic Properties | | |
|---|---|---|---|
| | Color | Flavor | Texture |
| PVP-Coated Potato Chips | golden brown | potato, hearty, earthy | very crisp, not oily |
| Uncoated Potato Chips | golden brown | potato, bean, grassy | crisp, oily |

EXAMPLE 2

The procedure of Example 1 was followed using a 5% solution of PVP (K-120). A 25% oil reduction was obtained.

EXAMPLE 3

The procedure of Example 1 was followed using a 20% solution of PVP (K-30). A 22% oil reduction was attained.

Although the invention has been described with reference to certain embodiments thereof, it will be understood that changes and modifications may be made which are within the skill of the art. Accordingly, it is intended to be bound by the appended claims only, in which:

What is claimed is:

1. A low oil potato chip product which is crisp and flavorful comprising potato slices which are coated with polyvinylpyrrolidone.

2. A low oil potato chip product according to claim 1 in which the polyvinylpyrrolidone coating is present in an amount of about 0.2–10% by wt. of the chip product.

3. A low oil potato chip product according to claim 2 wherein said polyvinylpyrrolidone coating is present in an amount of about 0.5–5% of the chip product.

4. A low oil potato chip product according to claim 1 wherein said coating is provided by contacting potato slices with an aqueous solution of polyvinylpyrrolidone in a concentration of about 1–50% by wt. polyvinylpyrrolidone.

5. A low oil potato chip product according to claim 4 in which the potato slices are dipped into a 5–20% by wt. polyvinylpyrrolidone solution.

6. A low oil potato chip product according to claim 1 wherein said polyvinylpyrrolidone coating is a substantially continuous, dry coating.

7. A raw, uncooked or partially fried potato chip comprising potato slices which are coated with polyvinylpyrrolidone.

8. The potato slices according to claim 7 wherein the amount of PVP is about 0.1–6% by weight.

9. The potato slices according to claim 8 wherein the amount is 0.4–3%.

10. A process of making a low oil potato chip product which is crisp and tasteful comprising treating potato slices with an aqueous solution of polyvinylpyrrolidone.

11. A process according to claim 10 wherein said potato slices are raw, uncooked, preformed or partially fried.

12. A process according to claim 10 wherein said potato slices are raw potatoes.

13. A process according to claim 12 wherein said raw potato slices are dipped into an aqueous solution having a concentration of 1–50% by wt. polyvinylpyrrolidone.

14. A process according to claim 13 wherein said concentration is 5–20%.

15. A process according to claim 10 in which the thus treated potato slices are dried and then deep fried.

16. A process according to claim 15 wherein the coated slices are air dried.

* * * * *